(12) United States Patent
Chang (10) Patent No.: US 8,609,010 B2
(45) Date of Patent: *Dec. 17, 2013

(54) MOLDING METHOD PROVIDING MICRO-STRUCTURES AND ARTICLES MOLDED BY THE METHOD

(75) Inventor: Chun-Yuan Chang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 598 days.

This patent is subject to a terminal disclaimer.

(21) Appl. No.: 12/755,429

(22) Filed: Apr. 7, 2010

(65) Prior Publication Data

US 2010/0260971 A1 Oct. 14, 2010

(30) Foreign Application Priority Data

Apr. 8, 2009 (CN) .......................... 2009 1 0301438

(51) Int. Cl.
*B29C 45/14* (2006.01)

(52) U.S. Cl.
USPC ........ 264/328.1; 264/132; 264/284; 264/316; 264/334; 264/400

(58) Field of Classification Search
USPC ............... 264/132, 284, 316, 328.1, 334, 400
See application file for complete search history.

(56) References Cited

U.S. PATENT DOCUMENTS

| | | | | |
|---|---|---|---|---|
| 4,482,515 A | * | 11/1984 | Buhler et al. | 264/102 |
| 4,865,793 A | * | 9/1989 | Suzuki et al. | 264/278 |
| 4,994,224 A | * | 2/1991 | Itoh et al. | 264/247 |
| 5,096,652 A | * | 3/1992 | Uchiyama et al. | 264/511 |
| 5,106,553 A | * | 4/1992 | Onisawa et al. | 264/106 |
| 5,376,324 A | * | 12/1994 | Kim | 264/241 |
| 5,676,896 A | * | 10/1997 | Izumida et al. | 264/132 |
| 5,738,287 A | * | 4/1998 | Vanderberg | 241/101.76 |
| 5,925,302 A | * | 7/1999 | Oono et al. | 264/267 |
| 6,143,227 A | * | 11/2000 | Heiden et al. | 264/267 |
| 6,193,916 B1 | * | 2/2001 | Richters et al. | 264/46.6 |
| 6,217,813 B1 | * | 4/2001 | Sorensen et al. | 264/328.1 |
| 6,752,946 B2 | * | 6/2004 | Toyooka | 264/154 |
| 7,458,793 B2 | * | 12/2008 | Toyooka et al. | 425/112 |
| 2001/0022412 A1 | | 9/2001 | Oono et al. | |
| 2001/0028129 A1 | * | 10/2001 | Oono et al. | 264/219 |
| 2001/0038162 A1 | * | 11/2001 | Oono et al. | 264/219 |
| 2005/0127565 A1 | * | 6/2005 | Wilson et al. | 264/275 |
| 2007/0026197 A1 | * | 2/2007 | Suga et al. | 428/172 |
| 2007/0184148 A1 | * | 8/2007 | Toyooka et al. | 425/542 |
| 2009/0194908 A1 | * | 8/2009 | Chen et al. | 264/328.1 |
| 2009/0230590 A1 | * | 9/2009 | Wu et al. | 264/328.1 |

FOREIGN PATENT DOCUMENTS

CN 101396858 A 4/2009

* cited by examiner

*Primary Examiner* — Christina Johnson
*Assistant Examiner* — Saeed Huda
(74) *Attorney, Agent, or Firm* — Altis Law Group, Inc.

(57) ABSTRACT

A method for forming micro-structures on a molded particle, comprises: providing a mold with a male mold and a female mold defining a mold cavity, providing an attachment film with micro-structures; transporting the attachment film into the mold, and providing a predetermined section of the attachment film closely to the mold cavity; closing the mold, wherein a parting surface of the male mold and the parting surface of the female mold do not contact each other; closing the mold again, and enabling the parting surface of the male mold and the parting surface of the female mold to contact each other, and cutting the predetermined section from the attachment film; stopping injecting plastic material; opening the mold and pushing out a molded article with micro-structures. A molded article formed by the foregoing method is also disclosed.

6 Claims, 9 Drawing Sheets

MOLDING METHOD PROVIDING MICRO-STRUCTURES AND ARTICLES MOLDED BY THE METHOD

BACKGROUND

1. Technical Field

The present application is related to formation of micro-structures on molded articles and articles molded by the method.

2. Description of Related Art

Portable electronic devices (such as mobile phones and electronic notebooks) are in widespread use. The external appearance of the housing of the portable electronic device has become a key factor for attracting consumers.

The external appearance of the housing is often made by In-Mold Roller (IMR). The IMR process comprises: printing ink on a film to form an ink layer, positioning the film to correspond to the mold cavity of the a mold by a transporter, closing the mold, injecting plastic material into the mold cavity, opening the mold and separating the ink layer from the film. The film also comprises a separation layer and a hardening layer, both stripped from the molded article after opening the mold. Edges of the hardening layer are not flush with edges of the ink layer attached on the molded articles. Thickness of the hardening layer is usually less than five micrometer, so it is easily to be scratched. After being stripped off, the separation layer and the hardening layer can not be used again.

Therefore, a method providing a decoration layer having micro-structures on a molded article with lower cost and increased hardness is desired.

DETAILED DESCRIPTION

Figure 1:
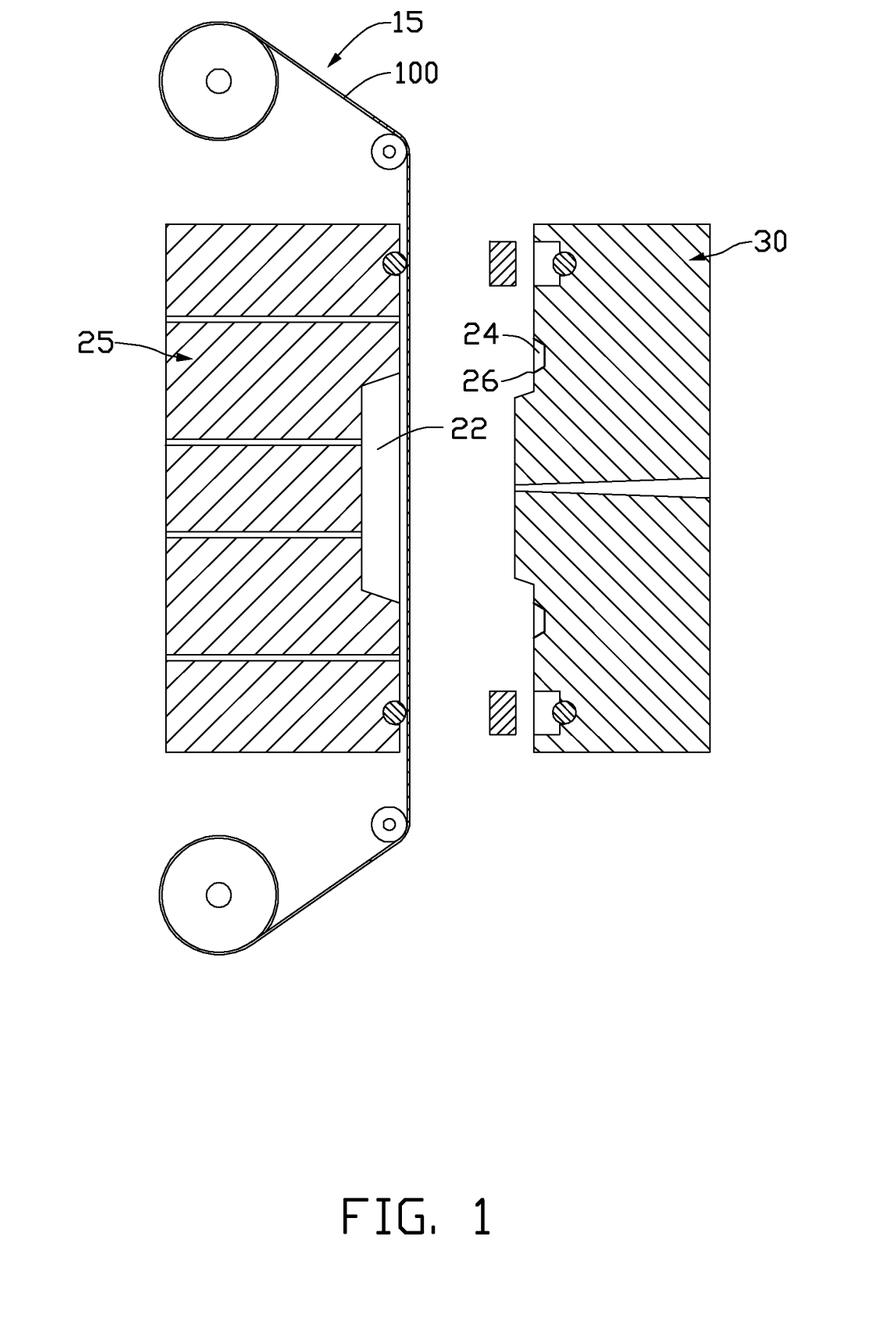
FIG. 1 is a cross-section view of a mold used in an embodiment of a method for forming micro-structures on molded articles in mold as disclosed.

FIG. 1 is a cross-section view of a mold used in an embodiment of a method for forming micro-structures on molded articles as disclosed. The mold comprises a transporter 15, a female mold 25 and a male mold 30. The transporter 15 comprises a pair of film transporting rollers (not labeled), provided on the upper side and the lower side of the mold respectively, to transport the film. The transporter 15 also comprises a direction roller (not labeled) to direct the film to a correct transporting direction.

Figure 9:
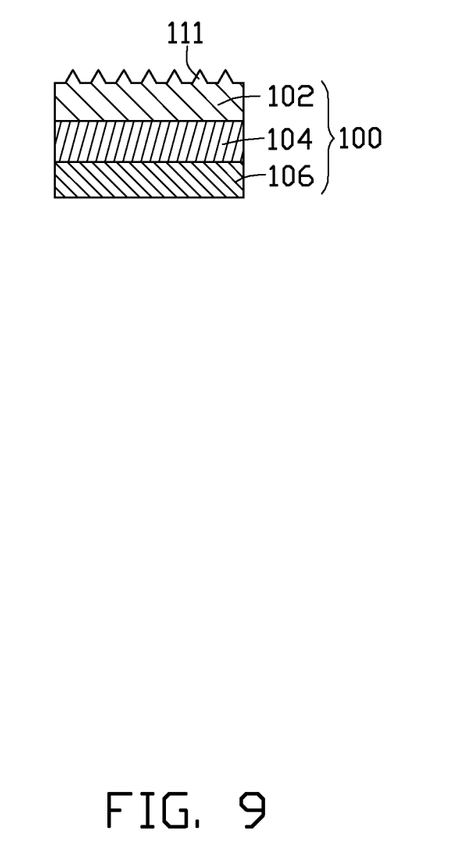
FIG. 9 is a partial cross-section view taken along a line VIII-VIII in FIG. 7, showing the composition of the attachment film as disclosed.

Please refer to FIG. 9, micro-structures 111 are processed on the film 100 before being received into the transporter 15. The attachment film 100 comprises a base layer 102, a decoration layer 104, and an adhesive layer 106. The thickness of the attachment film 100 is under 0.125 millimeters (mm), and is preferably 0.038 mm. Micro-structures are formed on the base layer 102 through hot embossing by a mold core with patterns, laser processing, screen printing, or gravure printing. The base 102 generally is made of one or more material consisting of: polycarbonate (PC), polyethylene terephthalate (PET), Polymethylmethacrylate (PMMA), oriented polypropylene (OPP), and polyvinyl chloride (PVC). The thickness of the base layer 102 is preferably within a range from 0.01 mm to 0.125 mm. The decoration layer 104 is formed on the base layer 102 through color ink painting to provide color or patterns. The decoration layer 104 also can be formed by vapor deposition or sputtering coating a metal layer on the base layer 102, to provide metallic sheen. The metal can be selected from one or more material in the group consisting of aluminum, chrome, copper, nickel, indium, and tin.

The adhesive layer 106 combines the attachment film 100 with a substrate of a molded article. The adhesive layer 106 can be made by one or more material selected from the group consisting of: polyurethane resin, chlorinated rubber, vinyl chloride-vinyl acetate copolymer resin, polyamide resin, polyester resin, epoxy resin, polycarbonate resin, alkene resin, and vinyl cyanide-butylene-styrene resin. The adhesive layer 106 can be applied on the base layer 102 by gravure printing, screen printing, flexography, spray coating or brush coating.

A mold cavity 22 is provided in one side of the female mold 25. Several exhaust slots are provided on one side of the female mold 25 which is opposite to the mold cavity, connected to an exhausting device, to make the film sent by the transporter 15 attached inside the mold cavity 22.

Figure 2:
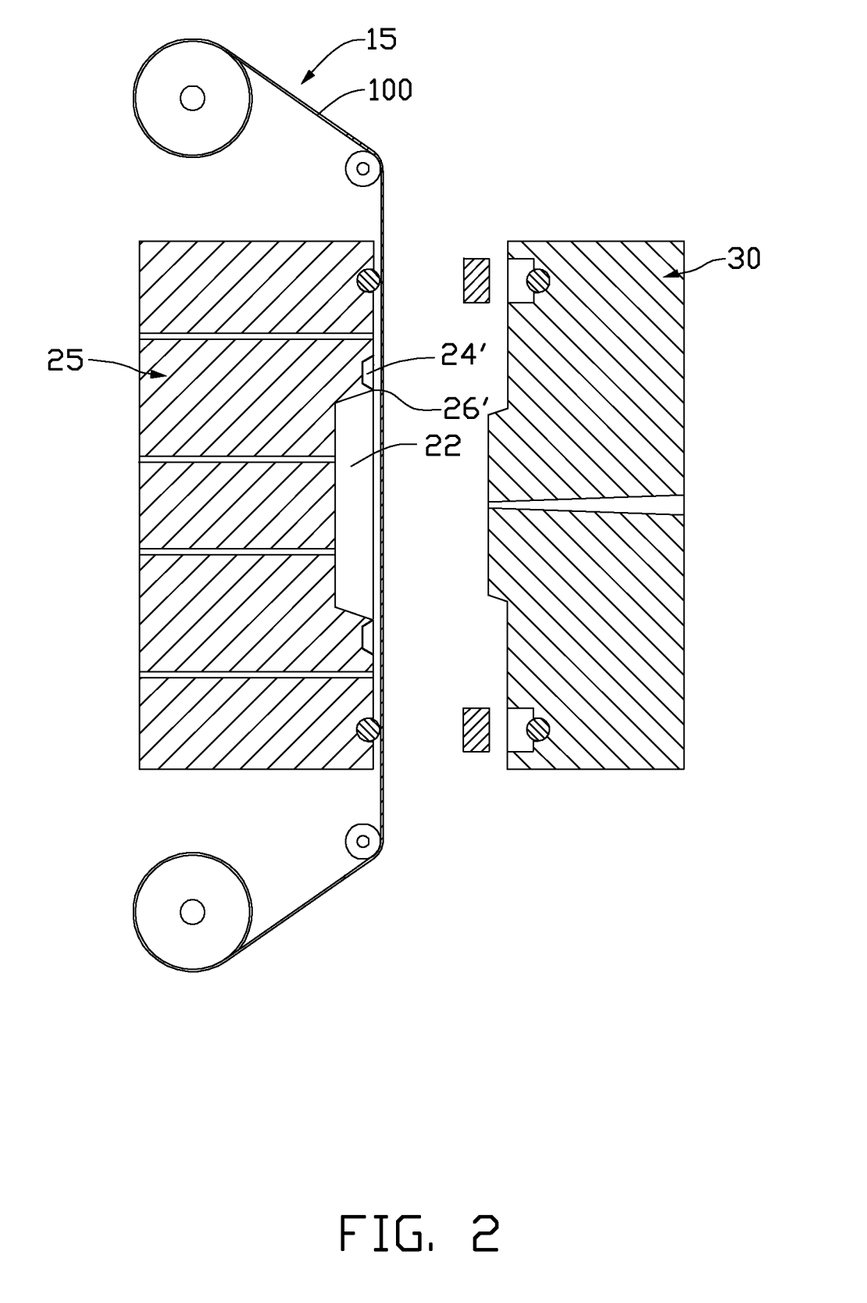
FIG. 2 is a cross-section view of another mold used in the method for forming micro-structures on molded articles in mold as disclosed.

The male mold 30 comprises a parting surface, which a recess 24 is provided on. The male mold 30 also comprises a cutting part 26 to cut a predetermined section of the film which corresponds to the mold cavity 22 of the female mold 25. An injection nozzle is provided on the center of the accommodative part to inject melted plastic material into the mold cavity 22 of the female mold 25. As shown in FIG. 2, another embodiment of a mold, a recess 24' can be defined on the parting surface of the female mold 25 along the mold cavity 22, and a cutting part 26' is formed around the mold cavity 22.

Figure 3:
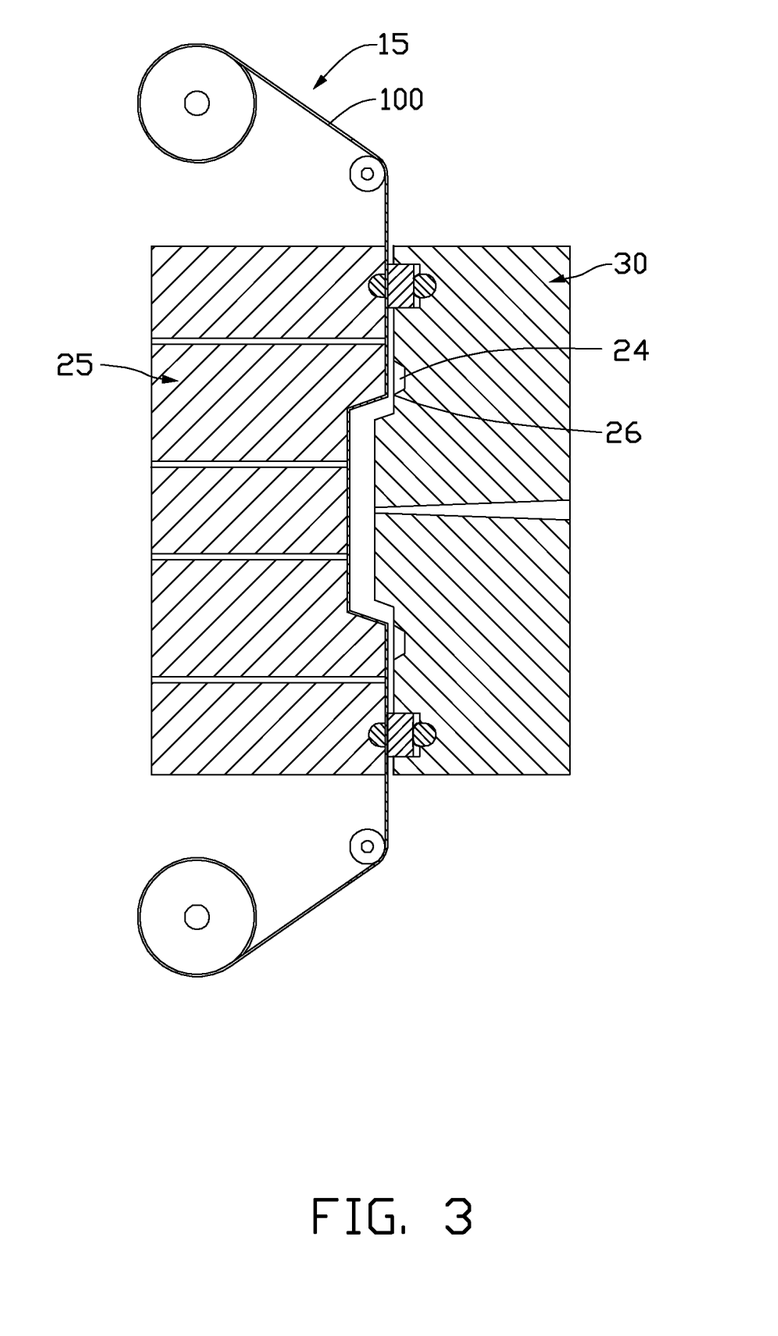
FIG. 3 is a drawing showing a first closing status of the mold of FIG. 1, wherein the male mold and the female mold not in contact, and melted plastic material prepared for injection into the mold.
Figure 5:
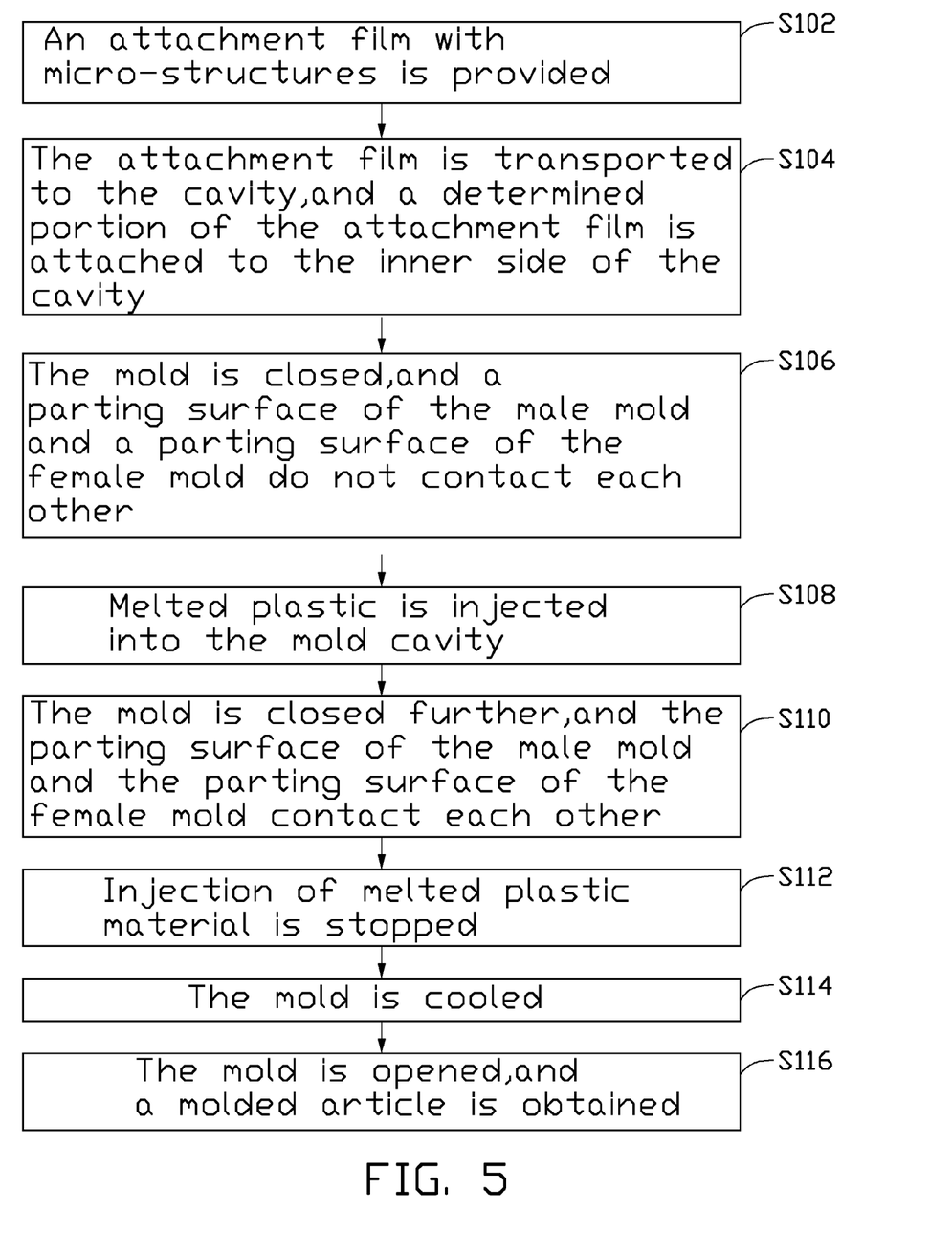
FIG. 5 is a flowchart of a first embodiment of the method for forming micro-structures on molded articles as disclosed.

In FIG. 5, a flowchart of a first embodiment of a method for forming micro-structures on a molded article shows, which is illustration by FIG. 3. In block S102, an attachment film 100 with micro-structures is provided. In block S104, the attachment film 100 is transported to the position between the female mold 25 and the male mold 30 along the parting surface of the female mold 25 by the transporter 15. A determined portion of the attachment film 100 is attached to the inner side of the cavity 22 of the female mold 25. The attachment is preferably implemented by exhausting air inside the mold cavity 22, with the attachment film 100 attached closely to the mold cavity 22 thereby.

In block S106, the mold is closed for a first time, and a parting surface of the male mold 30 and a parting surface of the female mold 25 do not contact each other. The mold is closed for first time, and a parting surface of the male mold 30 and a parting surface of the female mold 25 do not contact each other. In block S108, melted plastic is injected into the mold cavity 22 until 90%-95% of the space of the mold cavity 22 is filled, and a mold base is formed. The attachment film 100 is now attached on the surface of the mold base, and micro-structures are formed on the mold base.

Figure 4:
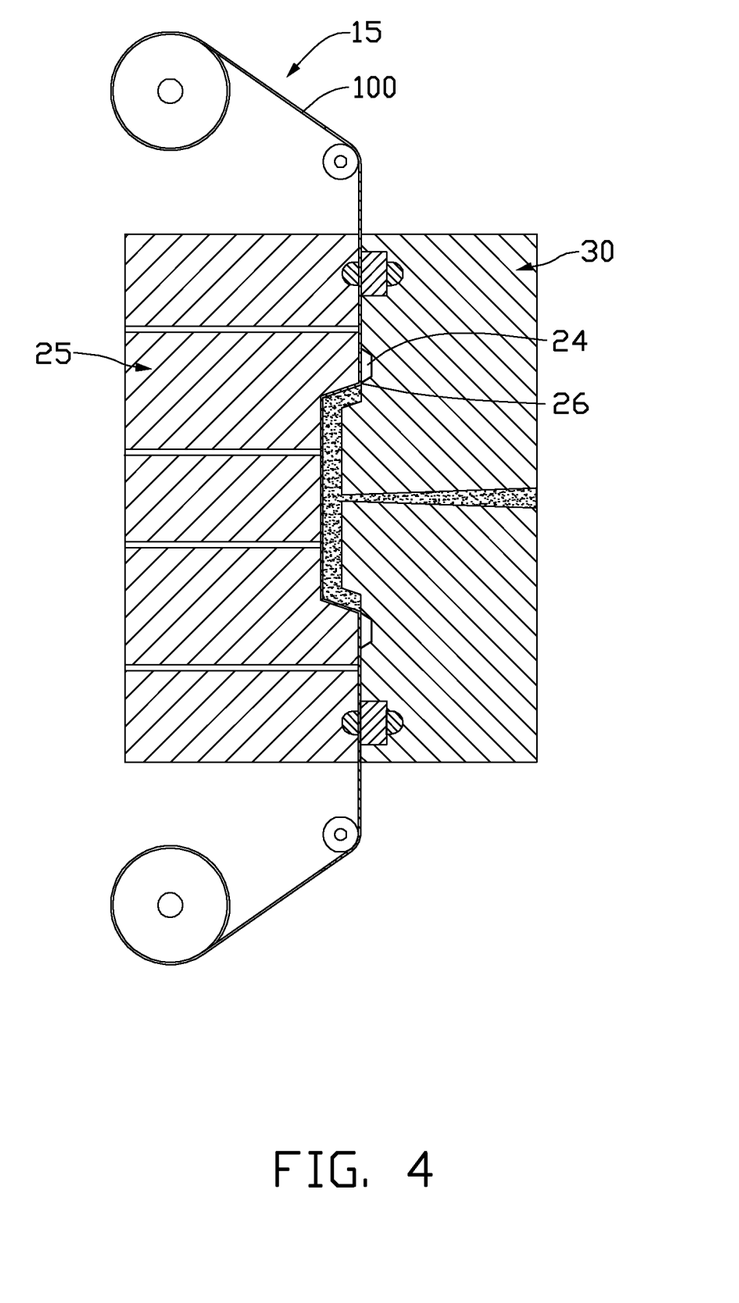
FIG. 4 is a drawing showing a second closing status of the mold of FIG. 1, with the male mold and the female mold in contact, and the injection of melted plastic material is completed, meanwhile a cutting part of the male mold cuts down a predetermined section of the attachment film.

In block S110, which is illustrated by FIG. 4, the mold is closed further, and the parting surface of the male mold 30 and the parting surface of the female mold 25 contact each other. As shown in FIG. 4, melted plastic material is injected into the mold. Squeezed by the male mold 30, the cutting part 26 of the male mold 30 cuts off the predetermined section of the attachment film 100 attached on the mold base with micro-structures. In block S112, melted plastic material injection stops. In block S114, the mold is cooled. In block S116, the mold is opened, and a molded article is obtained. Commensurately, the transporter 15 removes the attachment film 100 from the male mold 30 and the female mold 25, and a subsequent molding cycle begins.

Figure 6:
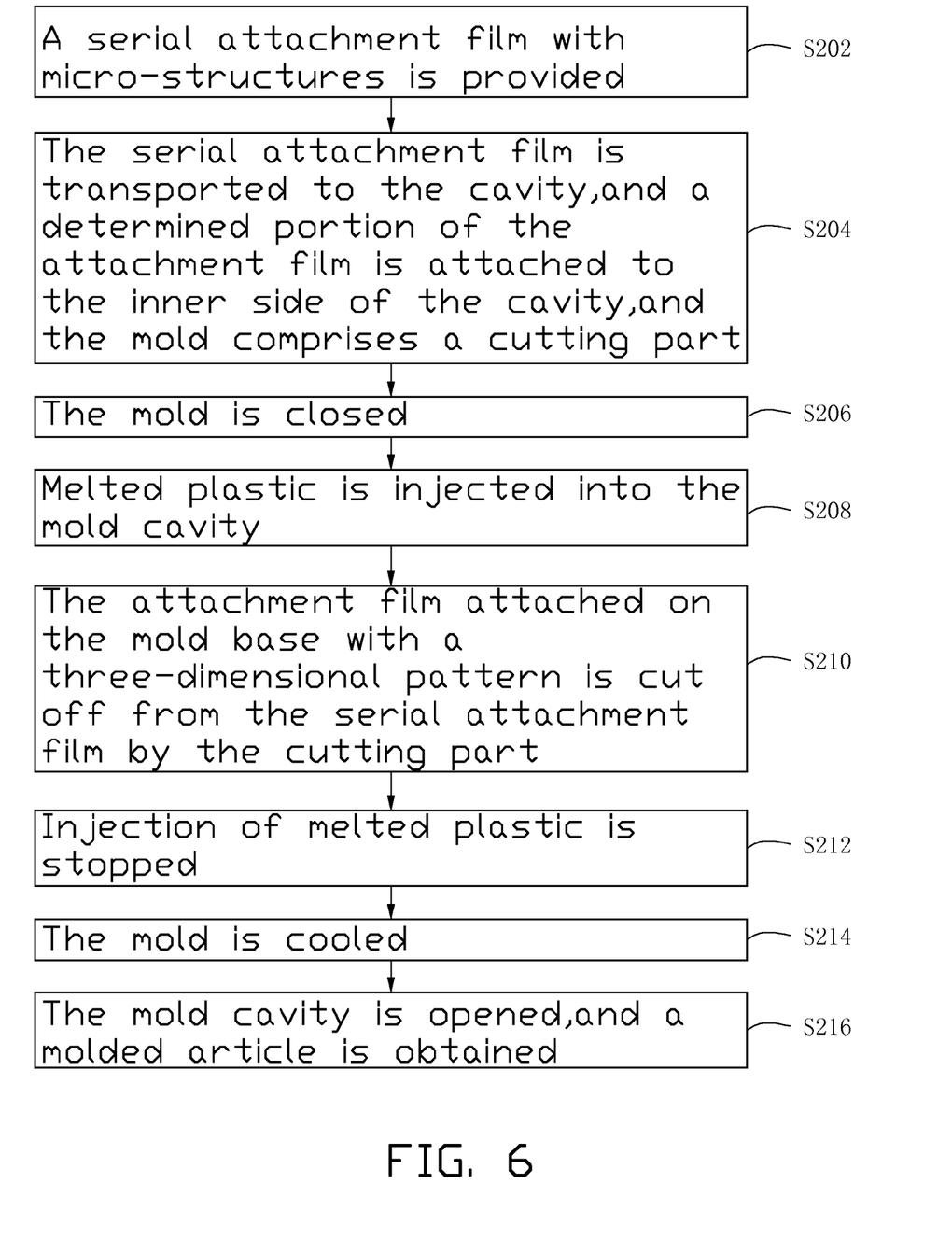
FIG. 6 is a flowchart of a second embodiment of a method for forming micro-structures on molded articles as disclosed.

FIG. 6 is a flowchart of the second embodiment of a method for forming micro-structures on a molded article. In block S202, a serial attachment film 100 is provided. In block S204, the serial attachment film 100 is transported to the position between the female mold 25 and the male mold 30 along the parting surface of the female mold 25 by the transporter 15. The mold comprises a cutting part 26. The transportation process can be referred to FIG. 3. In block S206, the mold is closed. In block S208, melted plastic is injected into the mold cavity 22 to form a mold base, and the attachment film 100 is attached on the mold base. In block S210, the attachment film 100 attached on the mold base with micro-structures is cut off from the serial attachment film by the cutting part 26 or 26'. In block S212, injection of melted plastic is completed. In block S214, the mold is cooled. In block S216, the mold cavity is opened, and a molded article with micro-structures on its surface is obtained.

Figure 7:
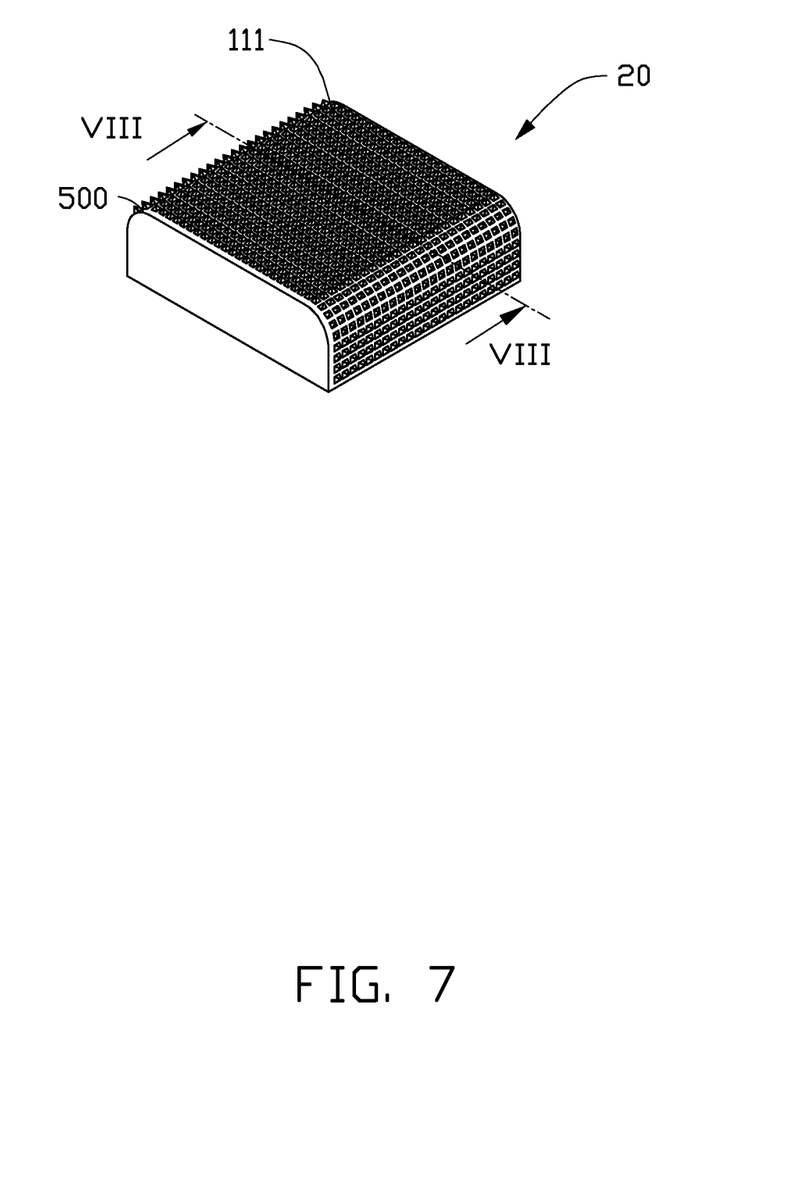
FIG. 7 is a perspective view of a molded article formed by the method as disclosed.
Figure 8:
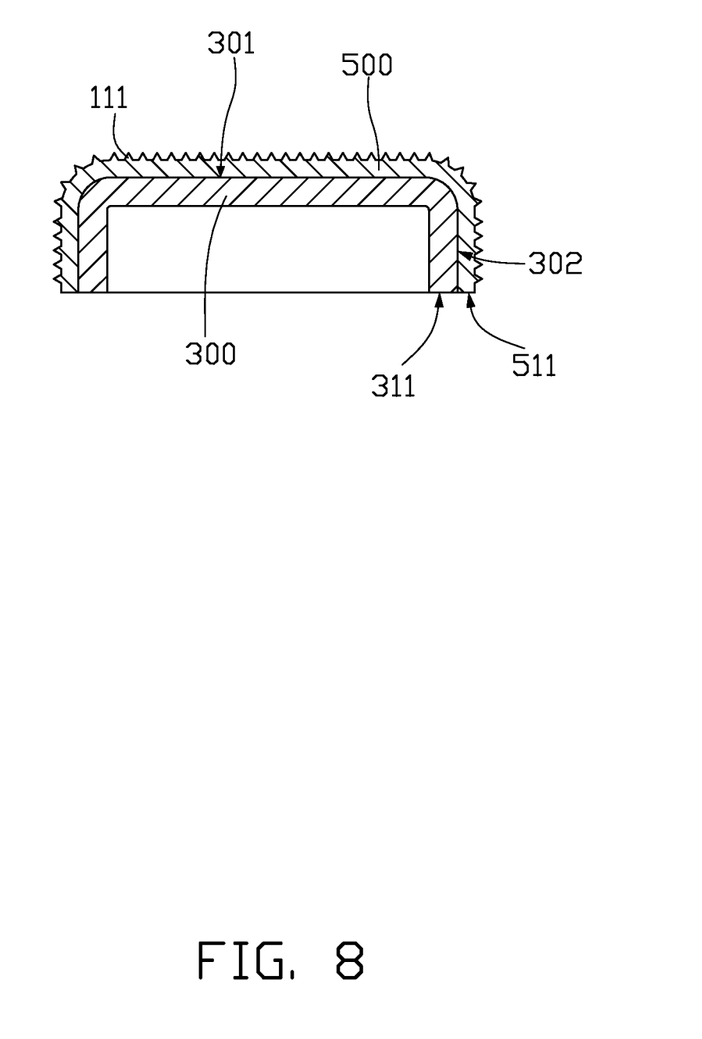
FIG. 8 is a cross-section view taken along a line VIII-VIII in FIG. 7.

FIG. 7 and FIG. 8 show a shell 20 formed by the method disclosed, comprising a substrate 300 and an attachment film 500 with micro-structures 111. The substrate 300 comprises a top surface 301 and an edge 302 surrounding the top surface 301. The attachment film 500 is attached on the substrate 300 and envelopes the top surface 301 and the edge 302. The substrate 300 comprises a first end surface 311, and the attachment film 500 comprises a second end surface 511. The first end surface 311 is substantially flush with the second end surface 511.

Molded articles formed by the disclosed method have colorful decorative micro-structures with higher hardness than those made by conventional molding techniques, and are not easily damaged by abrasion. Furthermore, molded articles formed by the disclosed method have uneven and rough surface that are able to prevent slight oil dirt. Furthermore, the molded articles formed by the disclosed method have flusher circumferential surface ends than other articles molded by conventional method. The disclosed method is suitable for serial automatic production, and has increased efficiency and quality in molding articles.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for forming micro-structures on a molded particle, comprising:
   providing a mold with a male mold and a female mold defining a mold cavity;
   providing an attachment film with micro-structures;
   transporting the attachment film into the mold, and applying a predetermined section of the attachment film closely to the mold cavity;
   closing the mold, wherein a parting surface of the male mold and a parting surface of the female mold are separate from each other;
   injecting plastic material into the mold cavity;
   during injecting, closing the mold further, enabling the parting surface of the male mold and the parting surface of the female mold to contact each other, and cutting the predetermined section from the attachment film;
   stopping injecting plastic material;
   opening the mold and pushing out a molded article with micro-structures.

2. The method for forming micro-structures on a molded particle as claimed in claim 1, wherein the micro-structures are applied on the attachment film by laser processing, embossing, screen printing or gravure printing.

3. The method for forming micro-structures on a molded particle as claimed in claim 1, wherein thickness of the attachment film is within a range between 0.038 millimeters to 0.15 millimeters (mm).

4. The method for forming micro-structures on a molded particle as claimed in claim 1, wherein the attachment film comprises a base layer and an adhesive layer.

5. The method for forming micro-structures on a molded particle as claimed in claim 4, wherein the attachment film further comprises a decoration layer provided between the base layer and the adhesive layer.

6. The method for forming micro-structures on a molded particle as claimed in claim 4, wherein the base layer is made of one or more polymer materials selected from the group consisting of polycarbonate (PC), polyethylene terephthalate (PET), polymethylmethacrylate (PMMA), oriented polypropylene (OPP), and polyvinylchloride (PVC).

\* \* \* \* \*